(12) United States Patent
Davis et al.

(10) Patent No.: US 7,374,645 B2
(45) Date of Patent: May 20, 2008

(54) ELECTROLYSIS CELL ASSEMBLY

(75) Inventors: James E. Davis, Riviera Beach, FL (US); Michel van Schaik, Loxahatchee, FL (US)

(73) Assignee: Clenox, L.L.C., Palm Beach Gardens, FL (US)

( * ) Notice: Subject to any disclaimer, the term of this patent is extended or adjusted under 35 U.S.C. 154(b) by 19 days.

(21) Appl. No.: 11/408,244

(22) Filed: May 25, 2006

(65) Prior Publication Data
US 2007/0272549 A1 Nov. 29, 2007

(51) Int. Cl.
C25B 9/00 (2006.01)
C25C 7/00 (2006.01)
C25D 17/00 (2006.01)

(52) U.S. Cl. ............ 204/242; 204/260; 204/279; 204/280; 204/286.1

(58) Field of Classification Search ........... 204/198, 204/242
See application file for complete search history.

(56) References Cited

U.S. PATENT DOCUMENTS

| | | | |
|---|---|---|---|
| 442,332 A | 12/1890 | Roberts | |
| 522,617 A | 7/1894 | Roberts | |
| 590,826 A | 9/1897 | Darling | |
| 673,452 A | 5/1901 | Roberts | |
| 914,856 A | 3/1909 | Meyer | |
| 1,074,549 A | 9/1913 | Henkel et al. | |
| 2,583,101 A | 1/1952 | Oliver | |
| 3,076,754 A | 2/1963 | Evans | |
| 3,390,065 A | 6/1968 | Cooper | |
| 3,640,854 A * | 2/1972 | Klein | ............ 205/128 |
| 3,721,619 A | 3/1973 | Ruehlen | |
| 3,812,026 A | 5/1974 | Bertrand et al. | |
| 3,964,991 A | 6/1976 | Sullins | |
| 3,984,303 A | 10/1976 | Peters et al. | |
| 4,169,035 A | 9/1979 | Stummer et al. | |
| 4,178,223 A * | 12/1979 | Ohashi et al. | ............ 204/415 |
| 4,201,651 A | 5/1980 | Themy | |
| 4,256,554 A | 3/1981 | Bjorkman, Jr. | |

(Continued)

FOREIGN PATENT DOCUMENTS

EP 0882815 A1 12/1998

(Continued)

*Primary Examiner*—Alexa Neckel
*Assistant Examiner*—Tayan Patel
(74) *Attorney, Agent, or Firm*—Akerman Senterfitt; J. Rodman Steele, Jr.; Gregory M. Lefkowitz

(57) ABSTRACT

A compression sealable electrolysis cell that is easily and reliably manufactured, maintained and repaired comprises two insulating end pieces which can position and seal two electrode tubes with electrical contacts separated by a ceramic membrane tube where fluid can be introduced at one end piece and removed at the other end piece in the spaces between the electrode tubes and the ceramic membrane tube. The design permits the compression of the entire assembly via the fixing of nuts on one or more threaded rods extending through both end pieces without the use of an adhesive or cement and without the imposition of torque or compressive stress on the ceramic membrane tube. The water or other fluid to be electrolyzed can be introduced tangentially to spaces between the electrode tubes and the ceramic membrane tube at a angle of 0 to 15 degrees to optimize flow and contact with the electrode tubes.

21 Claims, 9 Drawing Sheets

U.S. PATENT DOCUMENTS

| | | |
|---|---|---|
| 4,374,014 A | 2/1983 | Smith et al. |
| 4,481,303 A | 11/1984 | McIntyre et al. |
| 4,784,735 A | 11/1988 | Sorenson |
| 4,822,472 A | 4/1989 | Reis et al. |
| 5,082,543 A | 1/1992 | Gnann et al. |
| 5,427,667 A | 6/1995 | Bakhir et al. |
| 5,628,888 A | 5/1997 | Bakhir et al. |
| 5,753,098 A | 5/1998 | Bess, Jr. et al. |
| 5,871,623 A | 2/1999 | Bakhir et al. |
| 5,879,522 A | 3/1999 | Shaaban et al. |
| 5,985,110 A | 11/1999 | Bakhir et al. |
| 6,077,908 A * | 6/2000 | Yahiro ................. 525/218 |
| 6,254,741 B1 | 7/2001 | Stuart et al. |
| 6,409,895 B1 | 6/2002 | Ponzano |
| 6,855,450 B2 | 2/2005 | Molter et al. |
| 6,942,766 B2 | 9/2005 | Lemke |
| 2004/0060815 A1 | 4/2004 | Buckley et al. |
| 2005/0183949 A1 | 8/2005 | Daly et al. |

FOREIGN PATENT DOCUMENTS

| | | |
|---|---|---|
| EP | 0922788 A1 | 6/1999 |
| GB | 2107353 A | 4/1983 |
| WO | WO 98/58880 A1 | 12/1998 |

* cited by examiner

ELECTROLYSIS CELL ASSEMBLY

FIELD OF THE INVENTION

This invention relates to an electrolysis cell assembly of concentric cylindrical tubes.

BACKGROUND OF THE INVENTION

Electrolysis cells are useful for sanitizing water and for the generation of powerful biocides solutions from brine. Many types of electrolysis cell exist for these purposes. The basic feature of some of the most efficient cells is two concentrically disposed cylindrical electrodes with an ion permeable membrane separating the space between the two electrodes to define anode and cathode compartments. Typically an electrolyte solution is passed through the compartments separately or successively to generate the biocide and to sweep the accompanying gases that are generated through the system. The membrane permits the diffusion of electrolytes between the anode and cathode but retard the migration of electrolysis products at the anode and cathode from diffusing to each other reverting back to starting material or undesired side products.

Electrolysis cells using cylindrical electrodes and water insoluble ion permeable membrane or diaphragm between the electrodes have been described for more than 100 years as, for example, that described in U.S. Pat. No. 590,826. U.S. Pat. No. 914,856 describes a cell which permits the flow of electrolyte solutions separately through the anode and cathode compartments using concentric cylindrical electrodes with an ion permeable diaphragm. Numerous improvements have been described since that time including the materials used for fabrication and the features on the component anodes, cathodes, and ion permeable membranes or diaphragms. Less effort has been directed to the assembly process for such cells. The mass production, maintainability, and repairability of these cells have suffered from the nature of the features of the assembly that results. As electrolysis cells have become more extensively employed for water purification, the generation of biocidal solutions, and used in continuous medical and agricultural operations, problems associated with fouling become a consideration in selecting a reliable affordable unit. For this reason the need to easily and reliably produce a maintainable and repairable electrolysis cell assembly has become increasingly important.

Early cells were typically had the electrodes and the diaphragms cemented into place. They were subsequently, cemented, welded, or attached mechanically. Diaphragm material is a particulate material within a bag such that construction required a skilled packer, and the sealing of the material into the system made them impractical to perform maintenance. Membranes were introduced to avoid the problems associated with the packing of the diaphragm. Reliably positioning and attaching the membranes within the cell to achieve sealed anode and cathode compartments remains a problem. The use of soft and flexible polymeric ion permeable membranes are difficult to position and even more difficult to reliably seal. The use of ion permeable ceramic membranes avoid the problems associated with the polymeric membranes due to their soft and flexible nature, but introduce other problems of providing a reliable seal as they are fragile and display a propensity to crack when a stress is applied to them.

A superior compression sealable electrolysis cell assembly is described by Naida et al. in EP0922788 (B1) which has features to impart a spiral circulation of the electrolysis solution through the space between concentric cylindrical tubes. A compression seal is desirable as generally the assembly is used under a slight positive pressure and since a gas is generated and any blockage of flow can impose high pressures of the assembly. A portion of the assembly of EP0922788 (B1) is reproduced in FIG. 1, where an cylindrical electrode tube 4 is positioned outside of an ion exchange diaphragm tube 5 which is positioned outside of an inner rode 4 that functions as the counter electrode and is threaded on the outer ends to apply a compressive force on two bushings 1, or end pieces. These bushings 1 have gaskets 3 placed on seats between the tubes 4 and 5 and the bushings 1 and an o-ring 2 positioned to seal the rod to the bushings. The bushings also display channels 7, or ports, externally ending in pipe connections, or fittings, and proceeding to the electrode chambers 8, which are the spaces between the tubes 4 and 5 and the diaphragm tube 5 and the rod 6, tangentially to the inner generatrix of the base of corresponding cylinders at guide elements 9 placed below the exit from the channels to the electrode chambers. These guide elements 9 are to reinforce the flow of the electrolyte in spiral channels that are initiated by the position of the channels and are a ramp at an angle $\alpha$ to the plane of the gasket seat. The exit of the channels 7 and the guide elements 9 are the width of the electrode chambers 8. The assembly has limitations in that the geometry must include a central rod electrode 6 which is threaded to compress the assembly. This limits the composition of the rod to metals or other electrode materials which can be threaded and withstand the act of compression. The use of gaskets 3 to seal the outer electrode 4 and the ion exchange diaphragm tube 5 results in significant fabrication losses as the compressive force is necessarily imposed upon the ion exchange diaphragm tube 5 resulting in breakage of many units during construction.

The channels 7 described in EP0922788 (B1) must be inserted at an angle $\beta$ to address the electrode chambers 8 situated between the tubes 4 and 5 and the diaphragm tube 5 and the rod 6. These channels 8 are claimed to exhibit a right edge guide oriented at an angle $\beta$ greater than 0 degrees and smaller than 90 degrees to a the base elements of the cylinders. Smaller angles are preferable to larger angles to produce the spiraling flow as an angle of 90 degrees imparts no spiral at all and a small angle will increase the number of revolutions between entrance and exit. As the guide elements 9 are situated below the entrance channel 7, and can only increase the angle from that defined by the angle of the channels 7 by deflecting the flow to a higher angle. The guide elements 9 can not attract the flow and reduce the angle of the spiral from that imposed by the flow out of the channel 7. However, to inside edge of the outer tube 4 or 5, or more correctly its gasket 3 that it is resting upon and the outside and inside diameters of the electrode chambers 8 restricts the allowable angles to a much smaller window to that claimed. To achieve an angle less than 15 degrees, the diameter of the channel 7 must be impractically small at the entrance of the chambers 8. The figures and description of EP0922788 (B1), which is also shown in FIG. 1, indicate that the diameter of the channels 7 must match the width of the electrode chambers 8 and would be required for good flow. Given these constraints and the claimed constraints imposed upon the relative diameters of the rod and tubes, the angle for the outside electrode chamber can be no smaller than 24.6 degrees and no larger than 46.1 degrees and the angle for the inside electrode chamber can be from 19.7 degrees to 46.6 degrees, and larger if there is a thickness to the gasket. If the two electrode chambers are nearly equal in width, which would be most reasonable to achieve nearly equal flow rate and pressure, the angle of the channel must be approximately 37 degrees. Although larger angles than 46.6 degrees are not useful to achieve a effective spiral flow they could be achieved by a change in the face from which the channels proceed. The most desirable angle are less than 15 degrees, and they can not be achieved by the geometric requirements imposed in EP0922788 (B1). Therefore although EP0922788 (B1) claims angles from 0 to 90 degrees it teaches how to achieve angles of 19.7 to 46.6 degrees and for other considerations requires an angle of about 37 degrees. The most efficient spiral flow in the electrode chambers is achieved by much smaller angles than 19.7 degrees and these angles are not possible as disclosed in EP0922788 (B1).

The design of EP0922788 (B1) requires that the bushings 1 are in the form of a cap and that the inner electrode rod 6 is longer than the diaphragm tube 5 which is longer than the outside electrode tube 4. Both tubes 4 and 5 must be seated firmly on the gasket 3 and bushing 1 this requirement necessitates that stress is applied to the diaphragm tube 5.

To avoid the imposition of the compression placed on the diaphragm tube an end-cap was designed as described by Daily et al. in US20050183949 which is coassigned with this application. This end-cap is designed to permit the introduction of the electrolyte solutions at only 0 degree angle to the base of the cylinders. Although preferable to an angle greater than 20 degrees, it is not an optimal angle to form a regular spiral in the electrode chambers about the inner tube of the chamber. The end-cap is designed as a combination of three sections which are threaded to seal the sections and the electrode tubes are sealed with an epoxy cement rather than a mechanical compression. There is no seal or physical seat for the diaphragm tube. A tight fit between the orifice of one section of the end-cap and the diaphragm tube is required. By this design, an insufficient seal results in leakage between the two electrode chambers. Slippage of the tube can result in an inner electrode chamber that is blocked from the channel by the tube. Too tight of a fit results in breakage when placing the diaphragm tube into the end-cap section or when a torque is applied when one section is screwed onto the other section. In practice this results in as much as twenty percent breakage during fabrication of the assembly.

The goal of achieving a mass producible electrolysis cell that has a low failure rate of production remains. Furthermore, an easily and reliably manufactured, maintained and repairable electrolysis cell remains a need in the industry. Achievement of smaller more efficient angles of flow entry into the channels to optimize the efficiency of the cell is also desirable.

SUMMARY OF THE INVENTION

The invention is directed to a compression sealable electrolysis cell assembly. The assembly has two insulating end pieces, each having a three concentric seats to position and seal the tubes where the central tube is sealed using an o-rings or compressible ridges in the end piece one or more holes parallel to the central axis of the concentric seats. The central seat accepts a ceramic membrane tube whose length that is less than the distance between the central seats of the two end pieces when the entire assembly is sealed. The two other seats accept two electrode tube one on either side of the ceramic membrane tube with one or both electrode tubes whose length is equal to the distance between its seats when they and the entire assembly are sealed. An electrical connector is a feature of these tubes. The assembly includes four ports which end in fittings to accept tubing. Two of the ports connect to the space between the outer electrode tube and the ceramic membrane tube and bounded by the end pieces and other two ports connect to the space between the ceramic membrane tube and the inner electrode tubes bounded by the end pieces. The ports address the spaces through the end pieces or situated through the electrode tube near the end pieces. A fluid deflector can be included to direct the flow of a fluid in the assembly at an angle of 0 to 15 degrees relative to the plane of the seats of the end pieces to promote fluid flow as a spiral around the space between the tubes. The deflector can be a part of the end piece or attached to the end piece or an electrode tube. One or more rods threaded at one or both ends of each rod are inserted into or through the one or more holes in the end pieces and run parallel to the tubes. One or more nuts are tightened on the rods or the rods are driven into a threaded whole in a end piece causing the assembly to compress and seal.

The end piece can be a segmented structure where two or more sections are united at faces with complimentary topography with a feature in or on the topography to seal the sections when the assembly is compressed. They can be constructed of rubber or plastic or a combination of rubber, plastic, and metal.

The seal forming features in the end pieces are either compressible ridges which are part of the end pieces or o-rings or gaskets which are positioned on or adjacent to the seats where the tubes meet the end pieces or at a site where the complimentary topography of the sections contain these features or sites to accept and compress these features.

The end piece can be a cap with concentric seats sequentially sunk deeper from the inside face of the caps as seats are encountered proceeding from the outside seat to the inside seat on the cap. The end piece can be a plug with concentric seats sequentially sunk deeper from the inside face of the plug as seats are encountered proceeding from the inside seat to the outside seat on the plug. The end piece can be a plate wherein the concentric seats are sunk to equal or nearly equal depth, from the inside face of the plates with additional walls if needed to promote sealing at the seats. The different types of end pieces can be used in any combination of caps, plates and plugs.

The electrode tubes can be of any electrically conducting material which may be varied based on the application between carbon, conducting polymers, metals, metals coated with metal oxides, or insulators coated with a conducting surface that will be directed toward the ceramic membrane tube. These tubes will act as the electrodes when an electrical connection is made to the conducting portion of the tube. Titanium tubes can be used as the cathode and a titanium tube coated with a transition metal oxide can be used as an anode. The electrode tubes can be covered or coated with an insulator on the face that is not positioned toward the ceramic matrix tube. The ceramic matrix tube is an alumina tube or a alumina zirconia mixture.

DETAILED DESCRIPTION OF THE INVENTION

Figure 2:
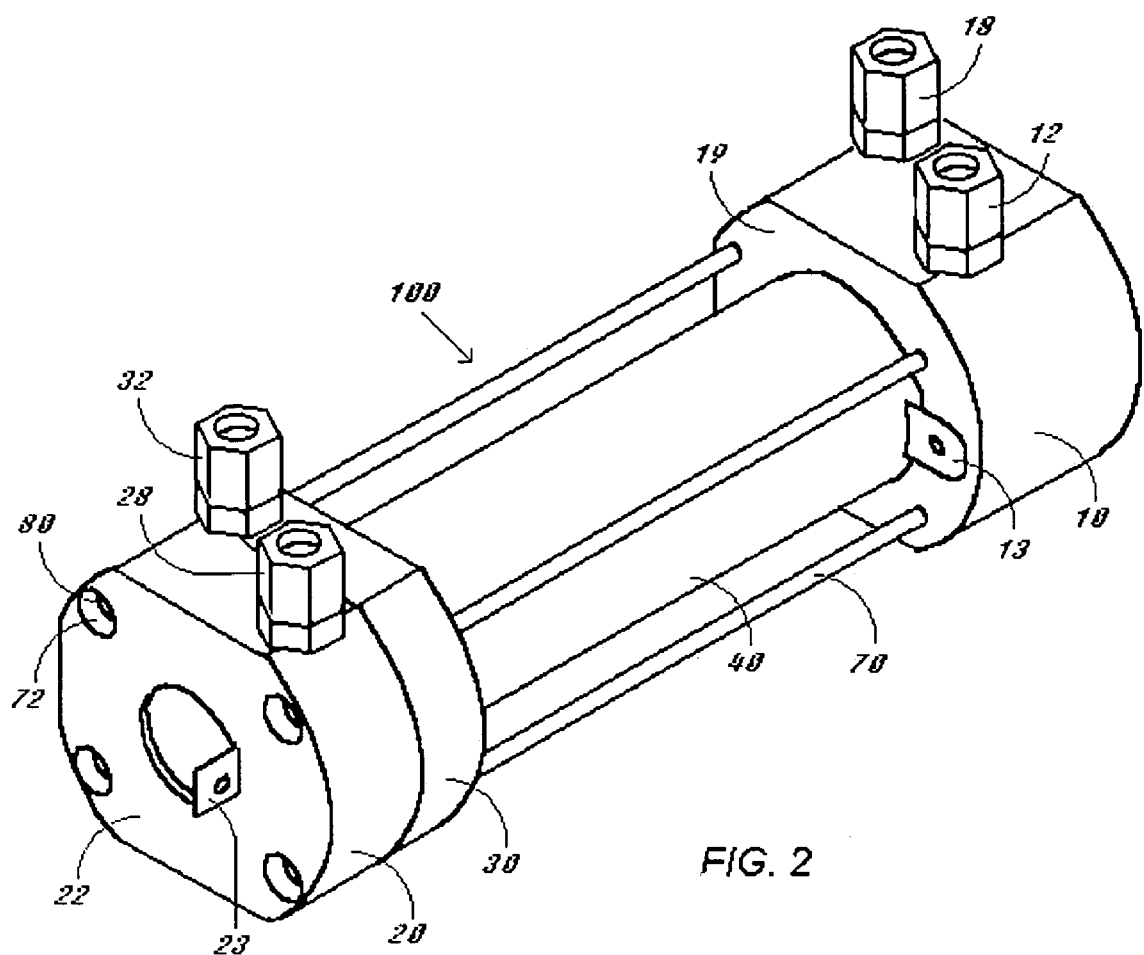
FIG. 2 Electrolysis cell assembly using four rods for the compression of the assembly into a sealed unit.
Figure 3:
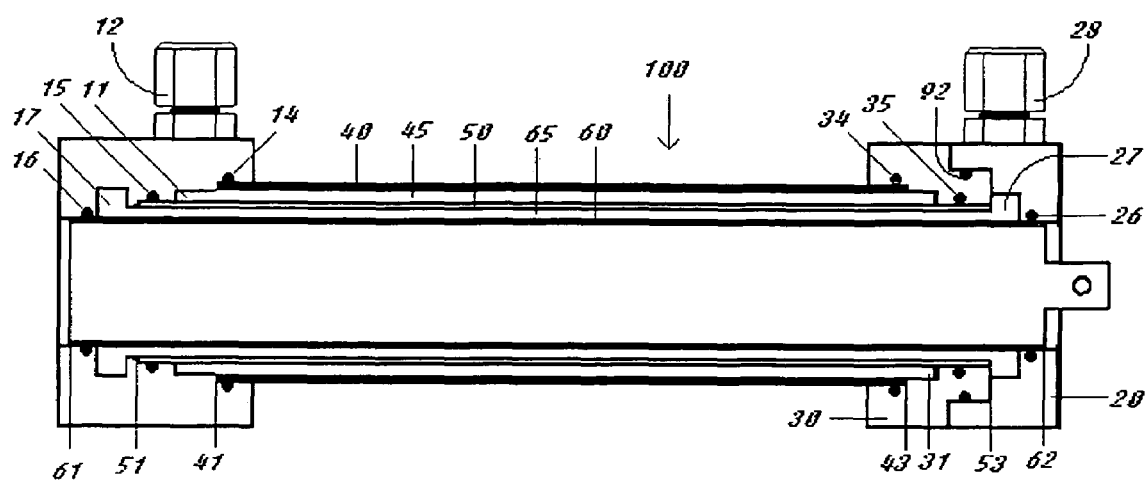
FIG. 3 View of an electrolysis cell assembly cut in a plane on the center axis between the port to one electrode compartment in one end cap and the port to the other electrode compartment in the other end cap.

The present invention is directed to the construction of an optimized electrolysis cell assembly that can be mass produced and provides the ability to regularly deconstruct to maintain and repair. One embodiment is illustrated in FIG. 2 and FIG. 3 assembly 100, where a cylindrical electrode 60 is positioned within a cylindrical ion permeable ceramic membrane 50 which is positioned within a complimentary cylindrical electrode 40 by the use of two end pieces which are shown as a one section end cap 10 and a two section end cap 20, 30. The design of these end caps permit the orientation and sealing of the entire assembly 100. One end cap 10 features ports 11 and 17 for direction of the flow of electrolyte solutions through ports ending in fittings 12 an 18 into the compartments defined by the spaces between the electrodes and the membrane 45, 65 and out of the compartment through ports 31 and 27 ending in fittings 32 and 28, respectively, of the other end cap 20, 30, respectively. The orientation of the ports 11, 17, 31, 27 are inherently 0 degrees to the inside and outside faces of the end caps 10 and 20, 30. The end caps 10 and 20, 30 are constructed to use four rods 70 to fix the assembly where the seal is achieved by compressing the end caps onto the tubes 40, 50, 60 in a manner such that the compressive force can be applied slowly and smoothly without the introduction of torque such that a reliable seal is produced without damaging the ceramic membrane tube 50.

Either of the electrode tubes 40 and 60 can act as the anode with the other acting as the cathode. The choice can be made by considerations of the ease of manufacture or requirements of the nature of the electrolysis process to be performed which can favor the anode or cathode chamber preferentially being the outer chamber. These considerations include the desired spacing between the electrodes and the ceramic membrane and the relative volume requirements for the balance of flows of the two electrolyte solutions. The electrode tubes 40 and 60 are constructed of an electrically conductive material. A non-metal conductor such as carbon, a conducting polymer, or a non conducting tube coated with an electrically conductive material on its face that is to be directed toward the ceramic membrane tube 50 as long as an electrical connection can be made to the conductive electrode tube surface. Preferably the electrode tubes 40 and 60 are metals and metals coated with a metal oxide on the face of the tube directed toward the ceramic membrane tube 50. The metals of the two electrodes can be different and one electrode can be a metal and the other a metal oxide coated metal. A preferred arrangement has the outside electrode tube 40 as the anode and is constructed from titanium and is internally coated with a mixed metal oxide where ruthenium oxide is a component of the coating. The inside electrode tube 60 acts as the cathode and is constructed from titanium in this arrangement.

The outer electrode tube 40 is shown in FIG. 2 with an electrical connector 13 welded to the outside of the tube near the inside face of inside face 19 of end cap 10. The inner electrode tube 60 has an electrical connector 23 on its end that is part of the electrode tube 60 and extends out of the outside face 22 of section 20 of the end cap 20, 30. Although not necessary for the function of the assembly, the outside of the outside electrode tube 40 and the inside of the inner electrode tube 60 can be coated with an insulating material for considerations such as safety. The coating can be constructed by dip, brush or spray coating an appropriate curable resin or insulator in solution or suspension onto the desired surface, or by wrapping with a tape, particularly to the outer electrode tube 40. Another option is to position an insulating sheath or tube on the outside of the outer electrode tube 40 or the inside of the inner electrode tube 60.

The two electrode tubes 40 and 60 are separated by an ion permeable ceramic membrane tube 50. Preferable it is an alumina containing ceramic. Most preferably it is composed of 80% alumina and 20% zirconium. Although the thickness of the tube walls can vary over a broad range depending on the application the electrolysis cell assembly 100 is to be used, the ceramic membrane tube 50 is relatively fragile and a tube wall thickness of 1 to 2 mm is preferred for many applications.

The relative diameter of the three tubes 40, 50, and 60 can vary within the single requirement that outer electrode tube 40 must be of greater diameter than the ceramic membrane tube 50 and the inner electrode tube 60 must be of lesser diameter. The actual diameters can vary depending upon the desired features of the electrolysis cell assembly 100. To this end the diameters can be varied to optimize the rate of electrolysis, rate of flow through the cell assembly, and other needs of the system to which the assembly will be used. Likewise, the relative length of the three tubes 40, 50, and 60 can vary within the single requirement of this embodiment that the outer electrode tube 40 must be shorter than the ceramic membrane tube 50 and the inner electrode tube 60 must be longer. The difference in length is dependent upon the desired depths of the six seats 41, 43, 51, 53, 61, and 62 of FIG. 3 from the inside faces 19 and 38 of the end caps into which the tubes are inserted. Again the depths of the seats can be determined by factors such as ease of construction and geometries to optimize the performance of the electrolysis cell assembly in the system it which it is to perform.

The end caps 10 and 20, 30 are constructed of an insulating material. The material can be a plastic or a rubber of sufficient structural integrity that it does not warp or flex during operation such that the fluid seal is not compromised. The end cap can be formed by molding or machining. Ports 11, 17, 31, 27 for introduction of the fluids to the electrolysis cell assembly 100 and one or more holes to accept one or more rods 70 by which the compression of the unit to form the seals and provide the structural integrity of the assembly 100 can be drilled. If a rubber is used a solid backing plate on the ultimate ends of the assembly can be used. This plate may be a plastic or a metal as long as the metal is insulated from one or both of the electrodes. A preferred fabrication of the end caps is by machining a block of polyoxyethylene which is commercially available as Delrin®.

Figure 4:
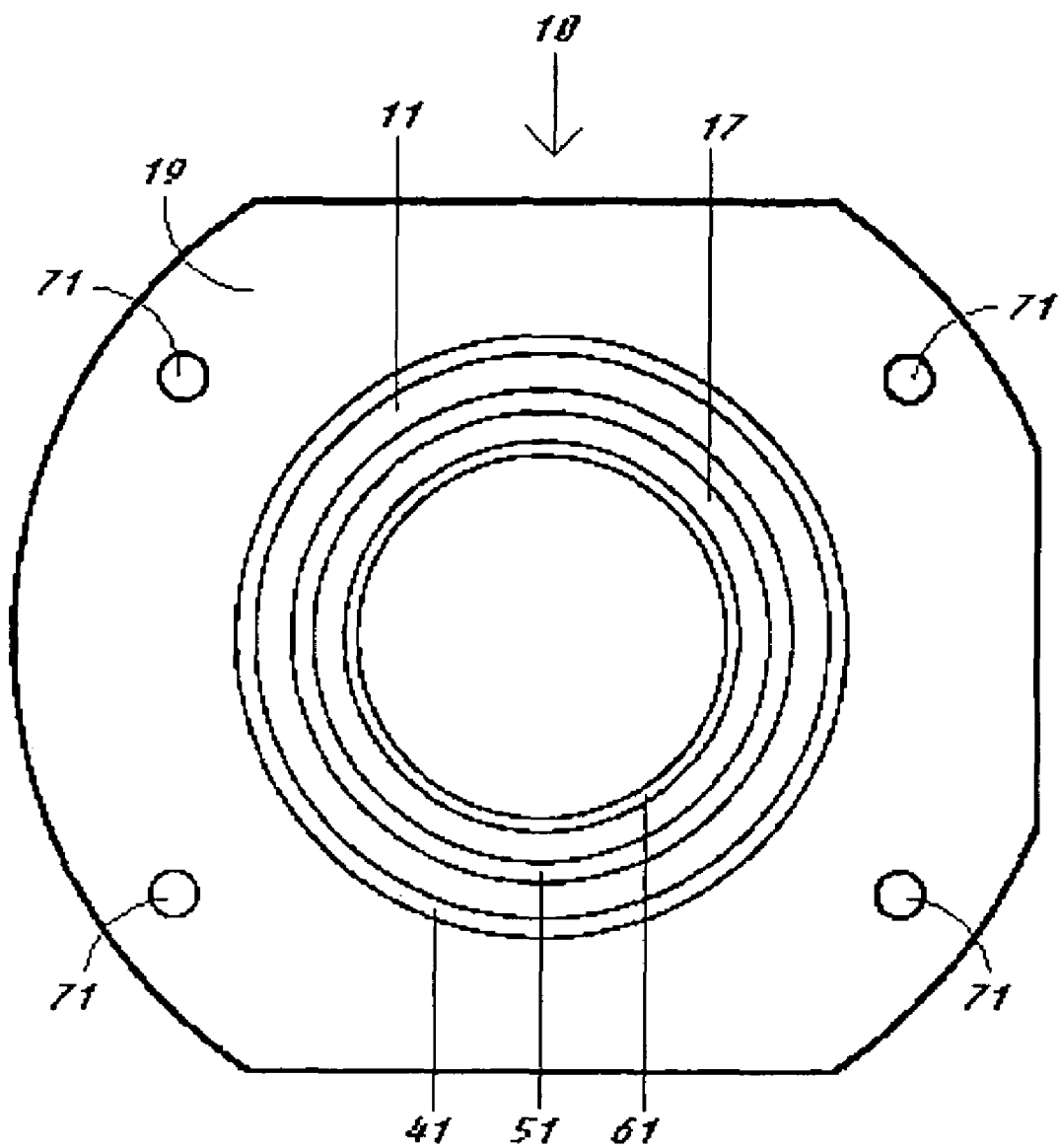
FIG. 4 End view of a one piece end cap from the side into which the tubes would be inserted.
Figure 5:
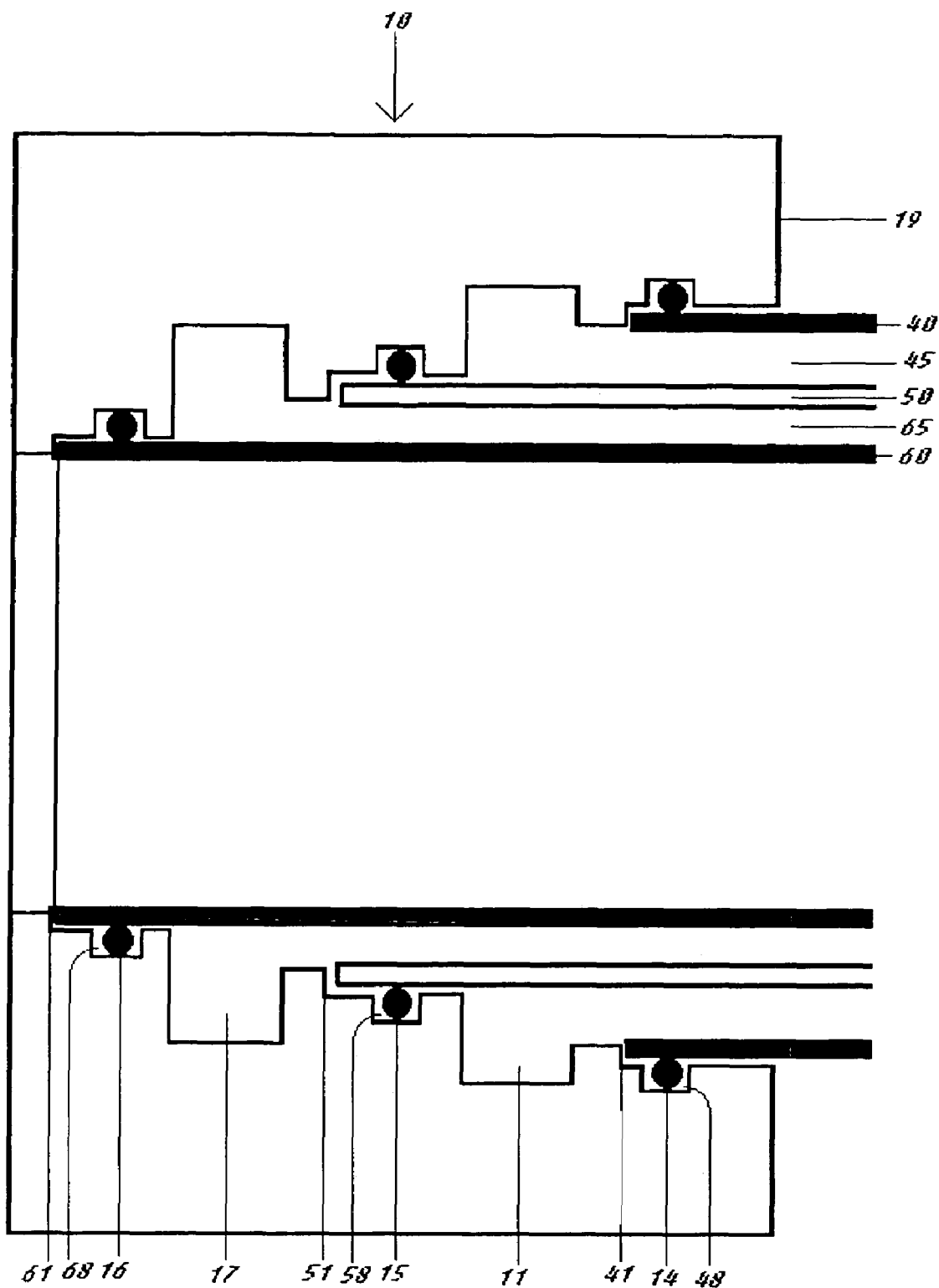
FIG. 5 View of a one piece end cap with inserted tubes cut in a plane on the center axis of the assembly between the ports in the cap.

One critical feature of the end caps is that the apertures ending on seats of different diameters closely match the outside diameters of the three tubes 40, 50, and 60. Proceeding from the inside face of the end caps 19 and 38, as illustrated in FIG. 4 for end cap 10, the outer largest aperture has a shallower seat 41 and 43 than that of the middle aperture seat 51 and 53 which has a shallower seat than that of the smaller aperture seat 61 and 62, as illustrated in FIG. 4 for face 19 of end cap 10 with seats 41, 51, and 61. Guides 48, 58 and 68 in end cap 10 and 49, 59 and 69 in end cap 20, 30 can be formed in the sides of each aperture wall, as clearly illustrated in FIG. 5 for end cap 10 and FIG. 6 for end cap 20, 30. The guides 48, 58, and 68 are in close proximity to the seats on the wall of each aperture such that an o-rings 14, 15, and 16 in end cap 10 and 34, 35, and 26 in end cap 20, 30 can be included to make the seal of the electrolysis cell assembly upon compression, as illustrated in FIG. 3. Alternately, or additionally a gasket can be placed on seats 41, 43, 61 and 62 to promote sealing of the electrode tubes 40 and 60. The relatively fragile ceramic membrane tube 50 requires the use of o-rings 15 and 35 rather than a gasket to form the seal such that sealing the assembly does not break the tube. It is necessary that upon assembly the length of the electrolysis cell assembly 100 is defined by the length imposed by one or both of the two metal electrode tubes 40 and/or 60 firmly bottomed to the seats 41 and 43 and/or 61 and 62 or to gaskets on the seats. Such a seating will correctly impose a distance between the middle seats 51 and 53 of the two end caps 10 and 20, 30 that is longer than the length of the ceramic membrane tube 50. In this way a compression stress is not imposed upon the ceramic membrane tube 50. The ceramic membrane tube 50 must be long enough to seal at both ends by the o-rings 15 and 35 even if one end of the ceramic membrane tube 50 is resting on a seat, 51 or 53.

A second critical feature of the end caps in this embodiment is the presence of two ports. One set of ports 11 and 31 begins at fittings 12 and 32 on an outside surface of the end caps 10 and 20, 30, respectively, and permits the flow of an electrolyte solution through the space 45 defined by the inside of the outer electrode tube 40 and the inside of the ceramic membrane tube 50 as illustrated in FIG. 2 and FIG. 3. The other set of ports 17 and 27 begins at the fittings 18 and 28 on an outside surface of the end cap, for end caps 10 and 20, 30, respectively, and permits the flow of an electrolyte solution through the space 65 defined by the inside of the ceramic membrane tube 50 and the outside of the inner electrode tube 60, as illustrated in FIG. 2 and FIG. 3. The outside of the port is a fitting 12, 18, 32, 28 which accepts a tube for introduction or exiting of the electrolyte solution to and from the electrolysis cell assembly 100. This fitting can be a compression fitting, as is illustrated in FIG. 2, or it can be a hose barb or some other coupling which is appropriate for the system within which the electrolysis cell assembly is to function. This orientation of the ports necessarily impose an angle of fluid entry that is 0 degrees relative to the seats in the caps. This orientation promotes a tight spiral flow around the central tubes 60 and 50 in the spaces 65 and 45 defined by the tubes 40, 50 and 60. Optionally, a ramp to guide the fluid flow may be included in the port 11, 17, 27 and 31 where the port merges with the spaces between the tubes 45 and 65. The pitch of the ramp can be varied to optimize the pitch of the spiral about the central tubes 50 and 60 where the angle of incline of the ramp is determined by the difference in diameter of the tubes defining the space the circumference of the center of the space. The optimal pitch of the ramp is approximately $\theta$ where $\tan \theta =$ (inside diameter of the outside tube−outside diameter of the inside tube)/average circumference of the space abut the inside tube. The ramp can be machined or molded into the end cap during its fabrication or fixed to the end cap after fabrication either mechanically or with the use of an adhesive.

Figure 7:
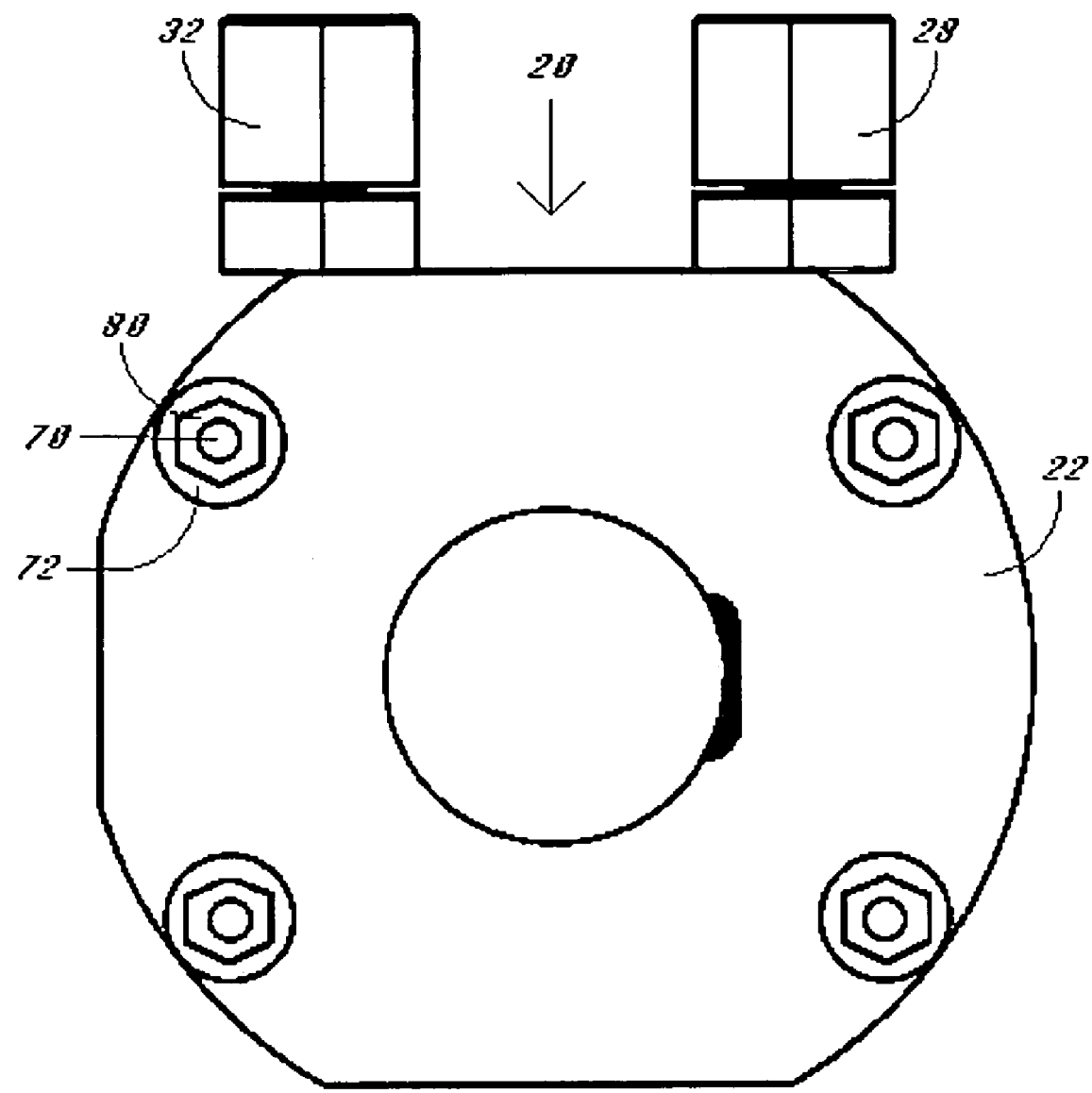
FIG. 7 End view of the electrolysis cell assembly at the two section end cap.

The third critical feature of the end cap in this embodiment includes four holes through which rods threaded at both ends 70 are passed proceed from one end cap 10 of the assembly to the opposite end cap 20, 30 parallel to the central axis of the assembly to which all tubes or caps are referenced. Nuts 80 are then tightened onto the ends of the rods 70, as illustrated in FIG. 7 for the outside end of end cap 20, 30. The tightening of the nuts compresses and seals the assembly 100. The outer end of the hole 71 can be bored out 72 to accept the nut 80 such that no features for compression of the assembly extend out of the end caps. Alternately, one end of the rod can have a head or a hook rather than a thread such that it can be attached to one end cap without the use of a nut 80. A rod ending with a head or a hook can be attached to one end cap through a hole 71 and the opposite threaded end inserted into a hole 71 and secured with a nut 80. Alternately when one end of the rod ends in a head it can be fed through the holes 71 in the first end cap and the head used to drive the rod into a hole in the second end cap that is threaded to match the treads of the rod end securing the rod and compress the electrolysis cell assembly without the use of a nut.

Figure 6:
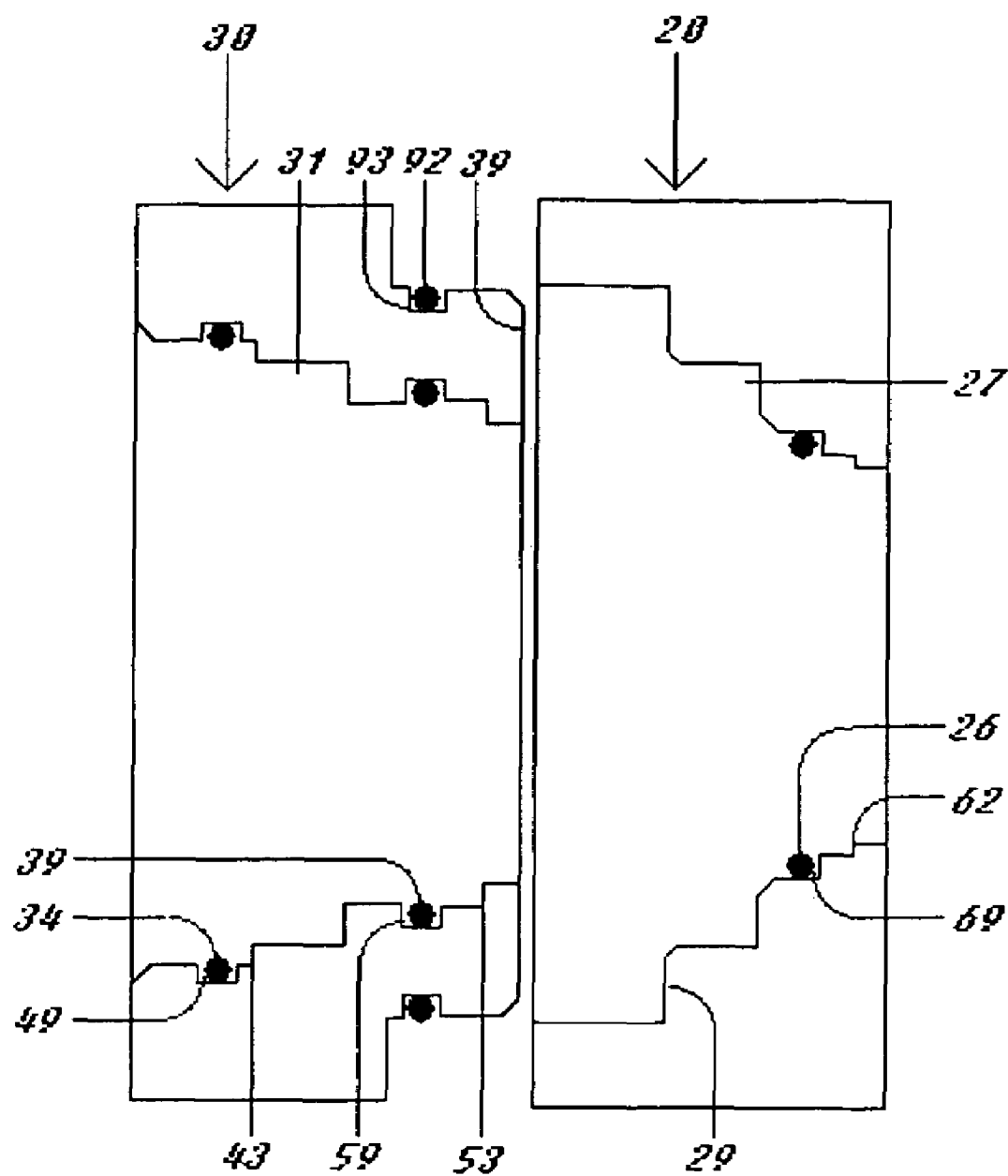
FIG. 6 View of the separated two section end cap cut in a plane on the center axis of the assembly between the ports in the cap such that only the portion of the port that encircles the tube is seen.

The end cap can be a single piece 10, or for ease of manufacture of maintenance of the electrolysis cell assembly, can be constructed as two 20, 30 or three sections, not illustrated, with interfaces 29 and 39 between the pieces matched with complementary topography, as illustrated in FIG. 6, to permit their combination into a unit 20, 30 that functions as the single piece end cap 10. The two or three sections must be sealed upon compression of the electrolysis cell assembly. The seal can be accomplished via a gasket or an o-ring 92, illustrated in FIG. 3 and FIG. 6, between the matching faces 29 and 39 of the two pieces 20 and 30. For the assembly 100 the use of the two sections 20 and 30 with the one section end cap 10 permits the positioning of tubes 40 and 50 into 10 such that the o-rings 14 and 15 form seals and then pressing section 30 onto tubes 40 and 50 while visually observing the sealing of the ceramic membrane tube 50 to assure that is not damaged. The electrode tube 60 is then inserted through the ceramic membrane tube 50 onto the seat 61 with o-ring 16 before o-ring 92 is placed in guide 93 and section 20 is pressed onto tube 60 and section 30 such that the complimentary topography of the outside of section 30 and the inside of section 20 sealing all parts of the assembly when the nuts 80 are tightened on the rods 70.

Figure 8:
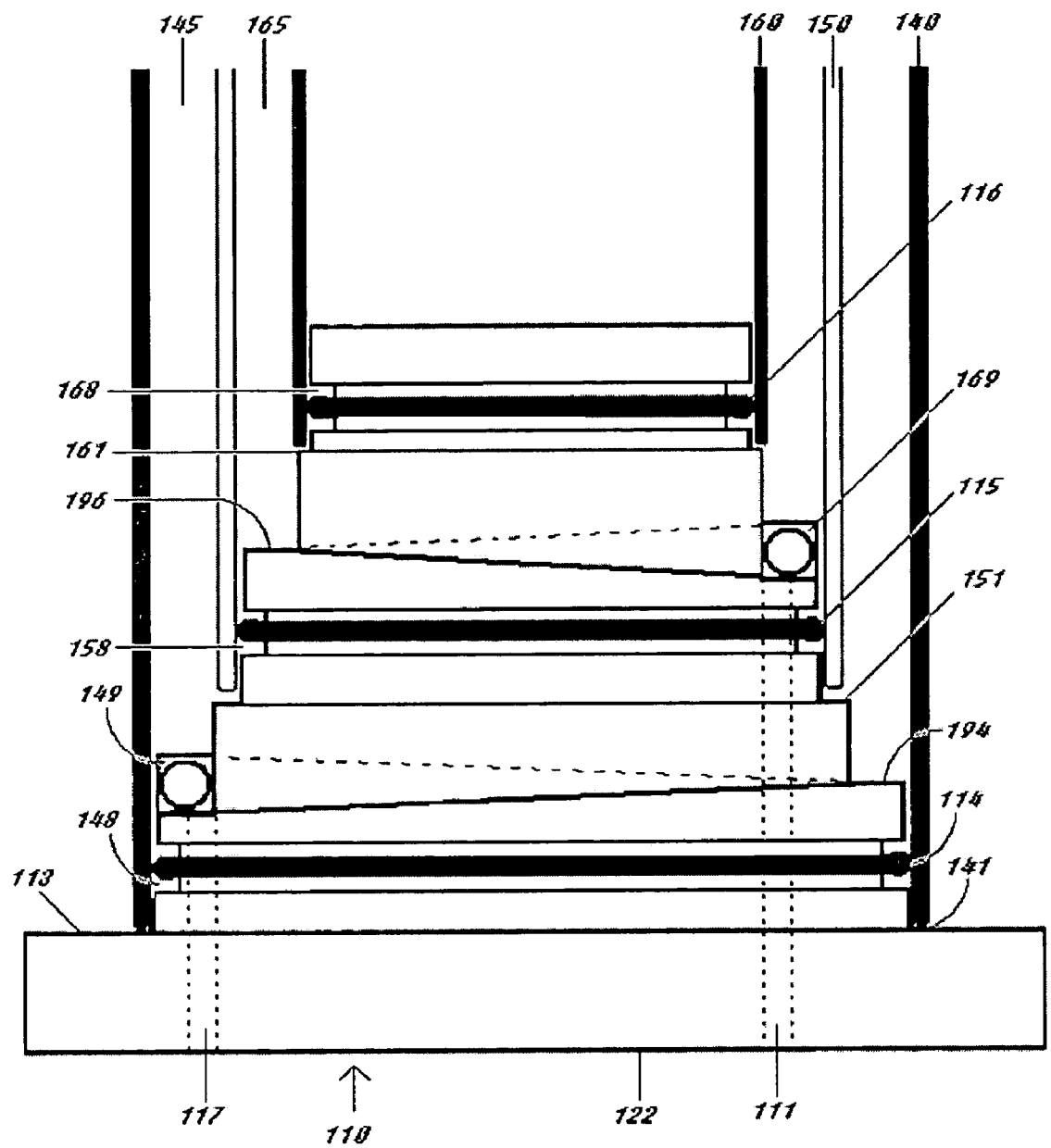
FIG. 8 View of a one piece end plug with only the inserted tubes cut in a plane of the center axis.

The end pieces can have other configurations as long as the configuration permits for the sealing of the assembly where the compressive force is imposed upon one or both electrolysis tubes and no significant compressive force is imposed on the ceramic membrane tube. An alternate embodiment to that using end caps is to use end plugs 110 as illustrated in FIG. 8. This embodiment shares the critical feature of the end caps described previously where plug displays seats of different diameters closely match the outside diameters of the three tubes 140, 150, and 160. Proceeding from the inside face of the end plug 119, the outer largest diameter seat 141, to accept the longest outer electrode tube 140, is deeper than that of the middle medium diameter seat 151 to accept the ceramic membrane tube 150, which has a deeper seat than that of the inner smallest diameter seat 161, which accepts the shortest inner electrode tube 160. Guides 148, 158 and 168 in the walls of the end plug 110 can be formed in the sides of each aperture wall, as clearly illustrated in FIG. 8. The guides are in close proximity to the seats on the wall of each aperture such that an o-ring 114, 115, and 116 in end cap 110. In this embodiment, the ports 111 and 117 would most easily be accessed from the outside ends of the plug 110. The inside electrical connector would be accessed through a plug as illustrated in FIG. 8 as an electrical connector 223 passing through the end plug 110 and attached to the inside of the inner electrode tube 160. The outside electrical connector 113 can also be passed through the end plug 110. This permits both electrical connectors 113 and 223 to be addressable on the same end of the assembly at the outside face 122 of the end plug 110.

Figure 1:
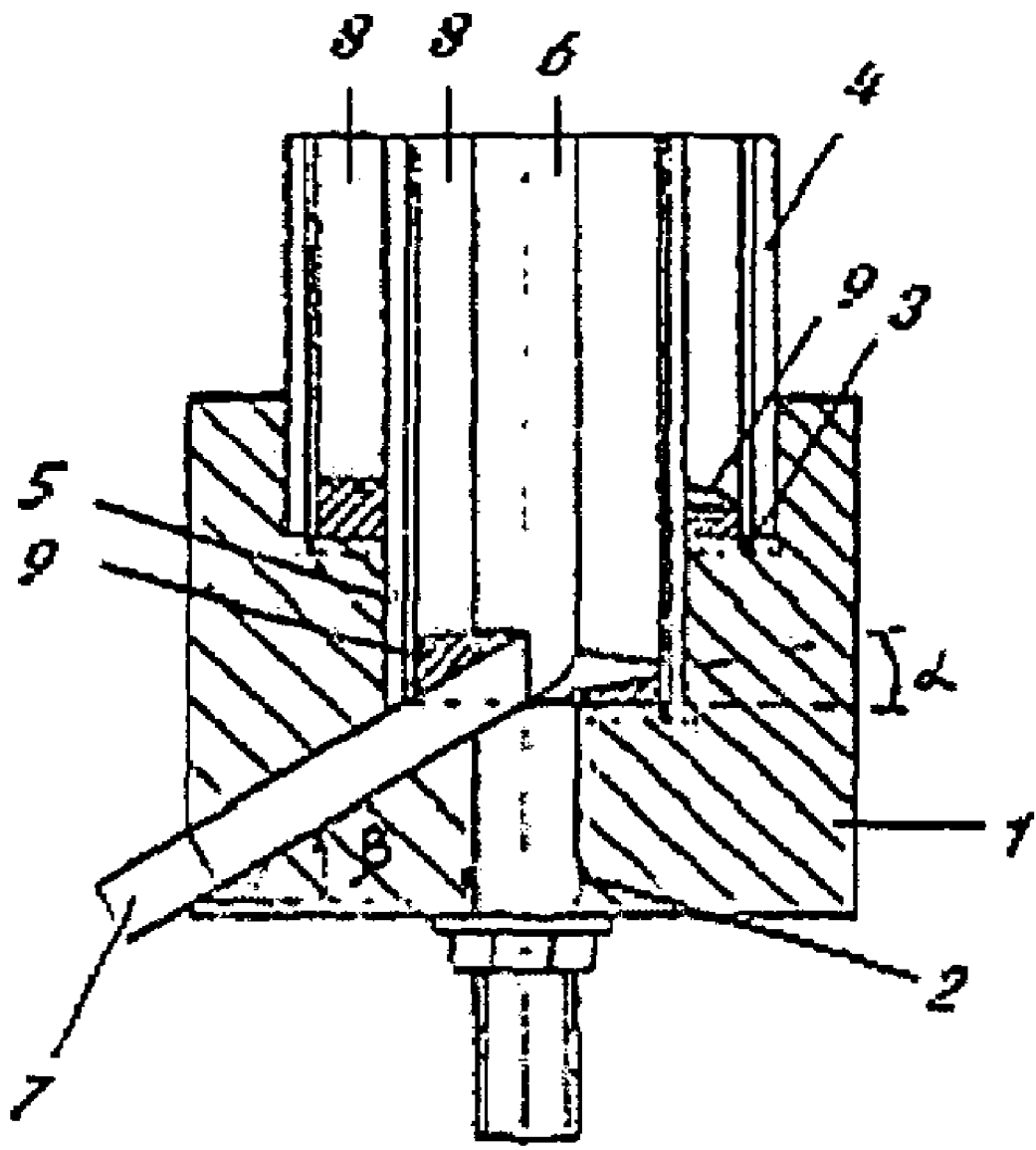
FIG. 1 The end bushing of EP0922788 (B1).

The ports 111 and 117 can be accessed from the outside face of the end plug. The deflection of the flow to be nearly 0 degrees to the seats to optimize the spiral flow can be achieved in two way. In the first manner, the ports 111 and 117 are drilled or otherwise formed directly from the outside face to the spaces between the tubes 145 and 165. At the point where the ports 111 and 117 are in proximity to the spaces 145 and 165, deflectors 149 and 169 can be situated to cause the flow to take a 90 degree turn and enter the portion of the port that merges with the spaces 145 and 146 at an angle of approximately 0 degrees relative the plane of the seat ceramic membrane tube 115 which will promote the spiral flow of the electrolyte solution. The deflectors 149 and 169 can be machined or molded into the plug 110, as illustrated in FIG. 8 with the outlet of the port 111 and 117 through the deflector 149 and 169 directing flow onto the surface of a ramps 194 and 196 that promotes the most efficient angle of spiral flow. The effective angle of the flow is defined by the angle of the ramp 194 and 196 rather than the angle of the exit from the deflector 149 and 169. This is in contrast to the situation illustrated in FIG. 1 where the angle β of the port 7 is obliged to be greater than the angle α of the guide element 9. Alternately, the deflectors 149 and 169 can be attached mechanically where a deflector can be seated an secured, for example, with a screw or it can be secured with an adhesive if the use of the adhesive does not interfere with the ability to maintain and repair the assembly. The optimal pitch of the ramp is defined as before with the end cap.

Figure 9:
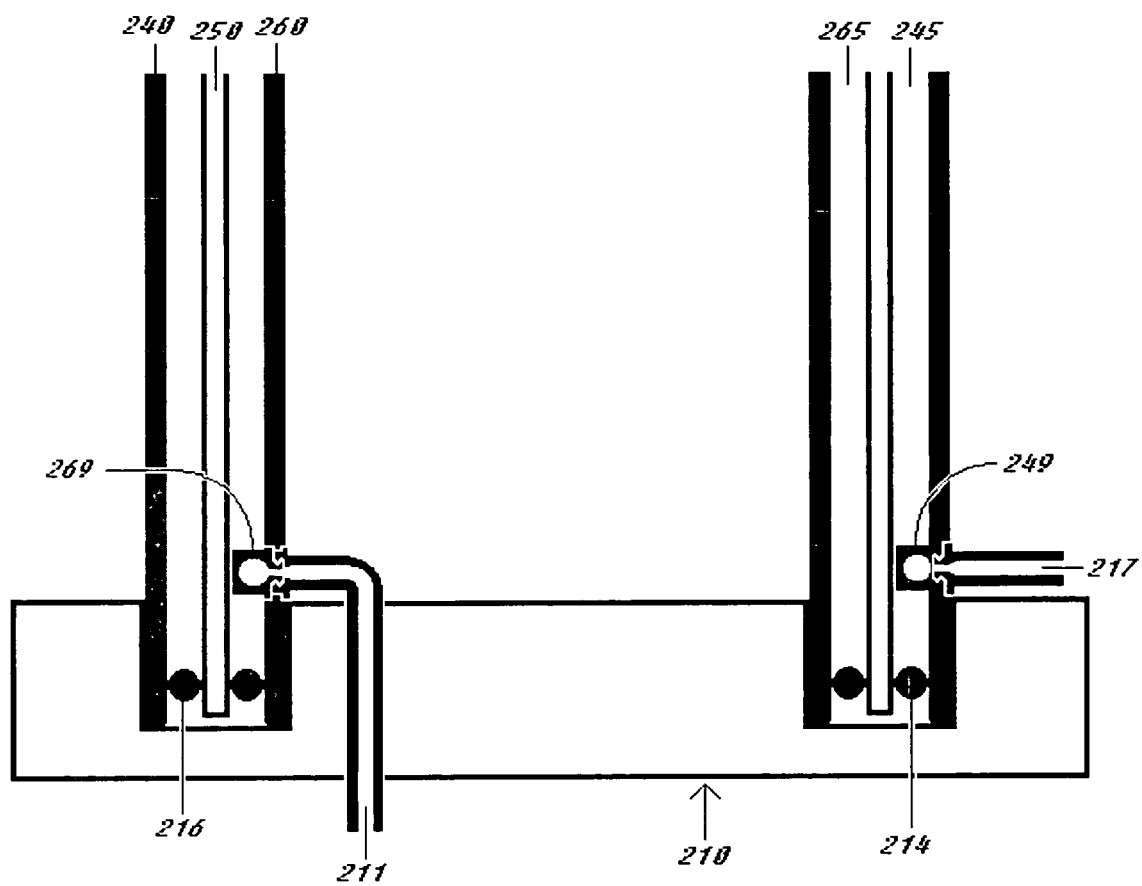
FIG. 9 View of a one piece end plate with inserted tubes cut in a plane on the center axis of the assembly.

A third embodiment for the end piece is to use end plates 210 as illustrated in FIG. 9. This embodiment shares the critical feature of the end pieces described previously where plate displays only a single wide trough effectively containing the three seats 241, 251, and 261 although the features of the seat are less visibly obvious. The outside wall of the trough closely matches the outside diameters of the outer electrode tube 240 and the inside wall of the trough closely matches the inside diameter of the inner electrode tube 260. The two electrode tubes 240 and 260 can be of essentially equal length and the ceramic membrane tube 250, can be only slightly shorter and secured between the two electrode tubes by two o-rings 214 and 216 in FIG. 9. This bundle of tubes 240, 250 and 260 can be combined including the o-rings 214 and 216 prior to insertion of the tubes in to the end plates. In this embodiment a convenient option can be the formation of ports 211 and 217 through the electrode tubes 240 and 260. The ports could also act as the electrical connections. The inside of the outer electrode tube 240 and the inside of the inner electrode tube 260 have deflectors 249 and 269 which can be welded in place. Alternately the deflector can act as a nut, as illustrated with 249 in FIG. 9, to accept the port 217 which is threaded to seal on the outside of the outer electrode tube 240. Alternately the deflector can act like a screw, as illustrated with 269 in FIG. 9, to accept the port 211 which is threaded to seal on the inside of the inner electrode tube 260. The deflectors can be fabricated or positioned such that the flow departs the deflector at the optimum pitch for spiral flow as defined by the pitch of the ramp for the end cap.

Where end plates have the geometries of the features for accepting the tubes can be varied as inspired by any combination of the features of the cap or plug. The different types of end pieces can be combined in any combination as long as the appropriate lengths of tubing are chosen and the holes to accept the rods are aligned to permit the sealing of the assembly by compression.

This electrolysis cell assembly can be used with a many different electrical systems and fluid plumbing systems. One appropriate system is described by Daley et al. in US20050183949 which is incorporated by reference.

While the preferred embodiments of the invention have been illustrated and described, it will be clear that the invention is not so limited. Modifications, changes, variations, substitutions and equivalents will occur to those skilled in the art without departing from the spirit and scope of the present invention as described in the claims.

We claim:

1. A compression sealable electrolysis cell assembly comprising:
    two electrode tubes of different diameters, each electrode tube having an electrical connector;
    a ceramic membrane tube situated around said inner diameter electrode tube and within said outer diameter electrode tube wherein said tubes are parallel to a central axis of the assembly;
    two insulating end pieces, each of said pieces comprising at least one hole extending on or parallel to said central axis and three concentric seats with diameters for positioning said tubes;
    at least one seal forming features in the vicinity of each of said seats, wherein said electrode tubes comprise a seal formed by said feature positioned between said seat and an end of said electrode tube or positioned on a surface of said end piece parallel to said electrode tube and said electrode tube, and wherein said ceramic membrane tube comprises a seal formed by said feature positioned on a surface of said end piece or said electrode tubes parallel to said ceramic membrane tube;
    two pairs of ports for entrance or exit of fluid, each comprising an external fitting for attachment of a hose or pipe, wherein said first pair of ports at opposite ends of said assembly internally addresses a space between said outer electrode tube and said membrane and said second pair of ports at opposite ends of said assembly internally addresses a space between said inner electrode tube and said membrane;
    at least one rod with at least one threaded end, each rod inserted through said holes in both of said end pieces with a nut on each of said threaded ends, wherein compression and sealing of said electrolysis cell assembly results upon tightening said nuts on said threaded ends and wherein upon sealing of said electrolysis cell assembly the distance between said seats for positioning said ceramic membrane tube is greater than the length of said ceramic membrane tube, whereby no compressive force is imposed upon said ceramic membrane tube by said seats.

2. The assembly of claim 1, wherein said end piece comprises two or three stackable sections of complimentary topography with at least one seal forming feature at every interface between adjacent sections wherein said seal forming feature is a compressible ridge, a rubber gasket, or a rubber o-ring.

3. The assembly of claim 1, wherein the seal forming feature comprises at least one compressible ridge protruding from said seat or from a wall adjacent to said seat.

4. The assembly of claim 1, wherein said seal forming feature comprises a rubber gasket, position on said seat, optionally constrained by a guide on said seat or on a wall perpendicular to said seat.

5. The assembly of claim 1, wherein said seal forming feature comprises at least one rubber o-ring, optionally position by a guide, on a wall adjacent to the seat.

6. The assembly of claim 1, wherein said end piece comprises a cap wherein said three concentric seats are sequentially sunk deeper into said cap proceeding from said outside seat to said inside seat.

7. The assembly of claim 1, wherein said end piece comprises a plug wherein said three concentric seats are sequentially sunk deeper proceeding from said inside seat to said outside seat.

8. The assembly of claim 1, wherein said end piece comprises a plate wherein said concentric seats are sunk to equal or nearly equal depth, and, optionally, can include raised walls on the inside or outside of the said seats.

9. The assembly of claim 1, wherein each of said end pieces is independently selected from a cap, a plug or a plate.

10. The assembly of claim 1, wherein the end pieces comprise a plastic, a rubber, or any combination of a plastic, a rubber and a metal.

11. The assembly of claim 1, wherein the end pieces comprise polyoxymethylene.

12. The assembly of claim 1, wherein the ceramic membrane tube is an ion permeable tube comprising alumina.

13. The assembly of claim 1, wherein the ceramic membrane tube comprises about 80% alumina and about 20% zirconia.

14. The assembly of claim 1, wherein the electrode tube comprises carbon, metal, or metal coated on the side directed toward the ceramic membrane tube with a transition metal oxide.

15. The assembly of claims 14, wherein the transition metal oxide comprises oxides of platinum, titanium, tantalum, niobium, iridium, ruthenium, rhodium, or palladium.

16. The assembly of claim 1, wherein the electrode tube comprises titanium.

17. The assembly of claim 1, wherein the electrode tube comprises titanium coated with a mixed metal oxide including ruthenium oxide.

18. The assembly of claim 1, further comprising fluid deflectors to direct the flow of a fluid introduced to or exiting from the space between two adjacent tubes at an angle of 0 to 15 degrees relative to the plane of the seats of the end pieces and is part of or is attached to the end piece or the electrode tube.

19. The assembly of claim 1, wherein one or both electrode tubes have an insulating covering on the face opposite the ceramic membrane tube comprising a coating, a tape, or a closely fitting plastic or rubber tube.

20. The assembly of claim 1, wherein said ports address said spaces through said end pieces or through said electrode tubes adjacent to the site of insertion of said electrode tubes into said end pieces.

21. The assembly of claim 1, wherein said entrance ports direct the flow of said fluid at an angle of 0 to 15 degrees relative to the plane of said seats of said end pieces.

* * * * *